United States Patent [19]

Sotoyama et al.

[11] Patent Number: 4,687,083
[45] Date of Patent: Aug. 18, 1987

[54] LOCK UP CONTROL OF A HYDRAULIC TORQUE CONVERTER TYPE AUTOMATIC TRANSMISSION

[75] Inventors: Kaoru Sotoyama; Shizuo Sumida; Toshiyuki Kikuchi, all of Hiroshima, Japan

[73] Assignee: Mazda Motor Corporation, Hiroshima, Japan

[21] Appl. No.: 592,362

[22] Filed: Mar. 22, 1984

[30] Foreign Application Priority Data

Mar. 24, 1983 [JP] Japan .................................. 58-49572

[51] Int. Cl.$^4$ ........................ F16H 45/02; B60K 41/02
[52] U.S. Cl. ................................... 192/0.076; 192/3.3; 192/3.31
[58] Field of Search ............... 192/0.033, 0.052, 0.076, 192/0.092, 0.096, 3.29, 3.3, 3.31, 3.33

[56] References Cited

U.S. PATENT DOCUMENTS

| | | | |
|---|---|---|---|
| 4,108,022 | 8/1978 | Arai et al. ...................... | 192/3.33 X |
| 4,449,618 | 5/1984 | Suga et al. ..................... | 192/3.31 |
| 4,456,107 | 6/1984 | Ito et al. ........................ | 192/3.31 |
| 4,457,411 | 7/1984 | Hiramatsu ...................... | 192/0.076 |
| 4,510,747 | 4/1985 | Yoshida ......................... | 192/3.29 X |
| 4,516,671 | 5/1985 | Nishikawa et al. ............. | 192/0.076 |

FOREIGN PATENT DOCUMENTS 56-39353 4/1981 Japan .
56-138559 10/1981 Japan .
2081413 2/1982 United Kingdom .

Primary Examiner—Rodney H. Bonck
Assistant Examiner—Richard M. Lorence
Attorney, Agent, or Firm—Fleit, Jacobson, Cohn & Price

[57] ABSTRACT

A vehicle automatic transmission including a torque converter having a lock up clutch. A lock up control circuit is provided and has a memory including a first lock up control line for controlling the engagement and release of the lock up clutch when the torque converter turbine speed is close to the pump impeller speed, and a second lock up control line which is drawn along a line wherein the engine output torque is substantially zero so that the lock up clutch is released at a given engine load when the turbine speed is decreased beyond the first lock up control line, or when the turbine speed is increased beyond the second lock up control line.

8 Claims, 14 Drawing Figures

LOCK UP CONTROL OF A HYDRAULIC TORQUE CONVERTER TYPE AUTOMATIC TRANSMISSION

BACKGROUND OF THE INVENTION

1. Field of the Invention

The present invention relates to a control of vehicle automatic transmissions and more particularly to control means for a torque converter lock-up mechanism.

2. Description of the Prior Art

A torque converter generally includes a pump impeller connected with an engine output shaft to be driven thereby, a turbine runner having an output member and a stator disposed between the pump impeller and the turbine runner, so that hydraulic fluid is circulated by the engine driven pump impeller through the turbine runner with the aid of the stator, which functions to deflect the hydraulic fluid from the turbine runner to a direction wherein the fluid flow does not disturb the rotation of the pump impeller when the hydraulic fluid flows into the pump impeller. With the circulation of the hydraulic fluid in this way, the turbine runner is subjected to a hydrodynamic force which drives the turbine runner. The torque converter has an automatic speed changing function wherein a torque amplification is made when the speed of the turbine runner is lower than that of the pump impeller and the output torque is gradually decreased as the speed of the turbine runner approaches that of the pump impeller. However, the torque converter is disadvantageous in that it inherently has slippage between the pump impeller and the turbine runner, which causes a decrease in transmission efficiency and poor fuel economy.

It has therefore been proposed to provide a lock-up clutch mechanism between the input and output shafts of the torque converter and have the lock-up clutch engaged when the turbine runner speed has become close to the pump impeller speed so that the turbine runner is rotated as a unit with the pump impeller. For example, Japanese Patent disclosure No. 56-138559 discloses a torque converter lock-up control system which has a memory map provided with a lock-up control line defining a lock-up zone and a lock-up release zone as a function of the engine speed and the engine load. The system has an engine speed detector and an engine load detector, and there is provided a lock-up control circuit which judges, depending on the signals from the detectors, whether or not the engine operating condition as determined by the engine speed and the engine load is in the lock-up zone.

This lock-up control system is considered as being advantageous in that torque converter lock-up is automatically controlled in a preferable manner in accordance with the engine operating condition, thereby resulting in improved fuel economy. It should however be noted that in the known torque converter lock-up system there is a possibility that the lock-up mechanism may be engaged even when the engine throttle valve is fully closed, if the engine operating condition is in the lock-up zone. This provides instability of operation because the engine output torque may fluctuate when the engine throttle valve is fully closed, so that vibration or unstable engine operation may be produced if the torque converter is locked up.

In Japanese Patent disclosure No. 56-39353, it is therefore proposed to release torque converter lock-up at or in the vicinity of the full close position of the engine throttle valve, irrespective of the relationship between the engine operating condition and the lock-up control line. However, the proposed system is not satisfactory in three respects. At first, it should be pointed out that the proposed system is still disadvantageous in respect of fuel economy. In fact, under an operating condition in which the engine throttle valve is slightly opened when the vehicle speed is relatively high, the engine is rotated at an unnecessarily high speed by being driven by the turbine runner if the torque converter is locked up, drawing an unnecessarily high amount of fuel to the engine.

Secondly, it should be pointed out that a substantial shock will be produced by the disengagement of the lock-up mechanism when the throttle valve is closed. Finally, in operation on a downslope, there will be an abrupt change in the engine braking effect when the lock-up mechanism is disengaged by closing the engine throttle valve. A similar abrupt change will also be experienced when the throttle valve is gradually opened and the lock-up mechanism is engaged.

OBJECT OF THE INVENTION

It is therefore an object of the present invention to provide a torque converter lock-up control system in which the aforementioned problems have been solved.

Another object of the present invention is to provide a torque converter lock-up system in which fuel economy is improved.

A further object of the present invention is to provide a torque converter lock-up control system in which any shock can be eliminated or minimized during engagement and disengagement of the torque converter lock-up mechanism.

A still further object of the present invention is to provide a torque converter lock-up control system in which lock-up control is effected at a low opening of the engine throttle valve along a lock-up control line in which there is substantially no torque transfer between the engine output shaft and the turbine runner.

SUMMARY OF THE INVENTION

According to the present invention, the above and other objects can be accomplished by a motor vehicle including an engine having an engine output shaft, a torque converter having an input and output members, the input member of the torque converter being connected with the engine output member to be driven thereby, lock-up means adapted for connecting said input and output members of said torque converter, said lock up means having means for actuating said lock-up means into and out of engagement, speed detecting means for detecting rotating speed related to rotating speed of one of said input and output members of the torque converter and producing a speed signal, engine load detecting means for detecting engine load and producing a load signal, lock-up control means including means for comparing an engine operating condition as obtained by said speed signal and said load signal with a predetermined zero engine output torque line wherein there is substantially no torque transfer between said engine output shaft and said output member of the torque converter, and means for producing a lock-up release signal which is applied to said lock-up means to disengage said lock-up means when the engine load is lower than said zero engine output torque line. The engine load may be detected in terms of engine throttle valve position or engine intake pressure. Alternatively, the engine load may be detected in terms of the intake gas flow or any other physical value which is considered as representing the engine load. The speed detecting means may be an engine speed sensor or a torque converter output member speed sensor. In the case where the torque converter output member is connected with a transmission gear mechanism, the rotating speed may be detected in terms of the rotating speed of one of rotating members in the transmission gear mechanism.

The engine throttle valve opening corresponding to the zero engine output torque line increases in response to an increase in the engine or torque converter output member speed. Therefore, if the throttle valve is closed beyound this zero load line under a relatively high engine or torque converter output member speed, there is a possibility that the engine is driven by the torque converter output member if lock-up is maintained. According to the present invention, however, lock-up is released at the throttle valve opening corresponding to the zero load line so that there will be no possibility of such dragging of the engine by the output member of the torque converter. Therefore, it is possible to eliminate the aforementioned problems in the prior art.

DESCRIPTION OF A PREFERRED EMBODIMENT

Structure of the Transmission

Figure 1:
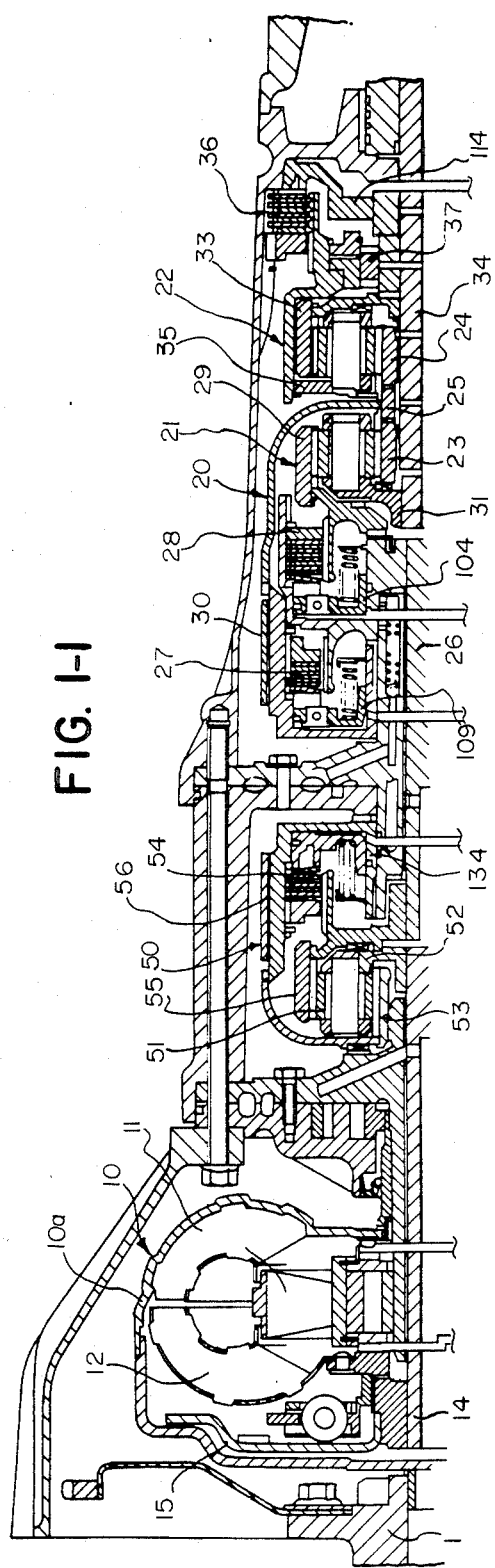
FIG. 1 is a diagrammatical view of an automatic transmission in which the present invention can be embodied.

Referring to the drawings, particularly to FIG. 1, there is shown an automatic transmission which comprises a hydraulic torque converter 10, a multiple stage transmission gear mechanism 20, and a planetary gear type overdrive transmission mechanism 50 arranged between the torque converter 10 and the multiple stage transmission gear mechanism 20.

The torque converter 10 has a pump 11 connected with an engine output shaft 1 through a converter casing 10a, a turbine 12 facing the pump 11 and a stator 13 disposed between the pump 11 and the stator 13. A converter output shaft 14 is connected with the turbine 12. A lock-up clutch 15 is provided between the converter output shaft 14 and the casing 10a which is connected to the pump 11. The lock-up clutch 15 is normally engaged with the casing 10a under the pressure of hydraulic fluid which circulates in the torque converter 10, and is released by hydraulic pressure, which is drawn to the space between the casing 10a and the clutch 15 from an external pressure source.

The multiple stage transmission gear mechanism 20 has a front planetary gear unit 21 and a rear planetary gear unit 22. The front planetary gear unit 21 has a sun gear 23 connected with a sun gear 24 of the rear planetary gear unit 22 through a connecting rod 25. The gear mechanism 20 has an input shaft 26 connected through a front clutch 27 with the connecting rod 25, and through a rear clutch 28 with an internal gear 29 of the front planetary gear unit 21. A front brake 30 is provided between the connecting rod 25 or the sun gears 23, 24 and a casing of the transmission. The gear mechanism 20 also has an output shaft 34 connected with a planetary carrier 31 of the front planetary gear unit 21 and an internal gear 33 of the rear planetary gear unit 22. The rear planetary gear unit 22 has a planetary carrier 35, and there are provided between the planetary carrier 35 and the transmission casing a rear brake 36 and a one-way clutch 36.

The planetary gear type over-drive transmission mechanism 50 includes planetary gears 51, a planetary carrier 52 rotatably carrying the planetary gears 51 and connected with the output shaft 14 of the torque converter 10, a sun gear 53 engaged with the planetary gears 51, and internal gear 55 which is also engaged with the planetary gears 51 and connected with the sun gear 53 through a direct connecting clutch 54. An over-drive brake 56 is provided between the sun gear 53 and the transmission casing. The internal gear 55 is connected with the input shaft 26 of the multiple stage transmission gear mechanism 20.

The multiple stage transmission gear mechanism 20 is of known type and can provide three forward driving gear stages and one reverse stage. The planetary gear type overdrive transmission mechanism 50 connects the shafts 14 and 26 directly when the direct connection clutch 54 is engaged and the brake 56 is released, and provides an over-drive connection between the shafts 14 and 26 when the brake 56 is engaged and the clutch 54 is released.

Hydraulic Control Circuit

The above-mentioned automatic transmission is provided with a hydraulic control circuit as shown in FIG. 1. The hydraulic control circuit has an oil pump 100 which is driven by the engine output shaft 1. Hydraulic oil is discharged under pressure from the pump 100 into a pressure line 101. The oil pressure is reduced by a pressure regulating valve 102 and applied to a select valve 103. The select valve 103 has a plunger which can be selectively positioned in one of the shift positions 1, 2 and D, and the pressure line 101 is communicated with ports a, b, c of the select valve 103. The port a is communicated with a hydraulic actuator 104 for the rear clutch 28. When the select valve 103 is positioned in the above mentioned position the actuator 104 makes the rear clutch 28 engage. The port a is also communicated with the left-hand end portion of a 1 - 2 shift valve 110 having a spool which is shown biased rightward in FIG. 1 under the oil pressure from the port a. The port a is further communicated with the right-hand end portion of the 1 - 2 shift valve 110 through a first line L1, the right-hand end portion of a 2 - 3 shift valve 120 through a second line L2, and the upper left-hand portion of a 3

- 4 shift valve 130 through a third line L3. Second and third drain lines D1, D2 and D3 are provided in the first, second and third lines L1, L2 and L3, respectively. These drain lines D1, D2 and D3 are respectively provided with first, second and third solenoid valves SL1, SL2 and SL3 for opening and closing the drain lines. When the port a is communicated with the line 101 the solenoid valves LS1, SL2 and SL3 are energized to close the drain lines D1, D2, D3, and as a result, the pressure in the first, second and third line L1, L2, L3 increases.

The port b is communicated with a second lock valve 105 through a line 140. The oil pressure which is applied from the port b to the second lock valve 105 acts to bias the spool of the valve 105 downwards. When the spool of the valve 105 is in the lower position, the line 140 is communicated with the line 141 so that the oil pressure is introduced into a brake engaging pressure chamber of the actuator 108 to engage the front brake 30. The port c is communicated with the second lock valve 105. The oil pressure which is applied from the port c to the second lock valve 105 acts to bias the spool of the valve 105 upward. The port c is also communicated with the 2 - 3 shift valve 120 through a pressure line 106. The line 106 is communicated with a line 107 when the spool of the 2 - 3 shift valve 120 is moved leftward by the pressure in the second line L2 which increases upon energizing the solenoid valve SL2 in the drain line D2. The line 107 is communicated with the releasing pressure chamber of the actuator 108. When oil pressure is introduced into such releasing pressure chamber, the actuator 108 is moved to release the brake 30 against the pressure in the engaging pressure chamber. Besides, the pressure in the line 107 is introduced into the actuator 109 for the front clutch 27 to make the clutch 27 engage.

The select valve 103 has a port d which is communicated with the pressure line 101 when the valve 103 is positioned in the position 1. The port d is communicated with the 1 - 2 shift valve 110 through a line 112, and with an actuator 114 for the rear brake 36 further through a line 113. When the solenoid valves SL1 and SL2 are energized, the spools of the 1 - 2 shift valve 110 and the 2 - 3 shift valve 120 are moved to thereby change the port connections for engaging appropriate brakes and/or clutches to establish 1 - 2, 2 - 3 shifting operations respectively. The hydraulic control circuit is also provided with a cut-back valve 115 for making the oil pressure from the pressure regulating valve 102 stable, a vacuum throttle valve 116 for varying the line pressure from the pressure regulating valve 102 according to the suction pressure in the engine intake passage, and a valve 117 for backing up the throttle valve 116.

Furthermore, this hydraulic control circuit is provided with a 3 - 4 shift valve 130 and an actuator 132a for controlling the clutch 54 and the brake 56 of the planetary gear type over-drive transmission mechanism 50. The actuator 132 has an engaging pressure chamber communicated with the pressure line 101. The brake 56 is operated when the actuator 132 is moved under the pressure in the line 101. When the solenoid valve SL3 is energized, the spool of the 3 - 4 shift valve 130 is moved downward to communicate the pressure line 101 with a line 122 so that the oil pressure is introduced into the line 122. The oil pressure introduced into the line 122 acts on a releasing pressure chamber of the actuators 132 to release the brake 56, and on an actuator 134 to make the clutch 54 engage.

Still further, the present hydraulic control circuit is provided with a lock-up control valve 133, which is communicated with the port a of the select valve 103 through a line L4. From the line L4, a drain line D4 extends which is provided with a solenoid valve SL4. When the pressure in the line L4 increases by closing the drain line D4 with the solenoid valve SL4 being energized, the lock-up control valve 133 has its spool moved to cut the communication between the lines 123 and 124 and drain the pressure in the line 124 so that the lock-up clutch 15 is engaged.

In the above arrangement, the relations of the respective transmission stages and the lock-up, with respect to the operations of the solenoids, the clutches and the brakes, are shown in Tables 1 through 3.

TABLE 1

| Shift position | Solenoid valve | | |
| --- | --- | --- | --- |
| | 1 | 2 | 3 |
| 1 | OFF | OFF | OFF |
| 2 | ON | OFF | OFF |
| 3 | ON | ON | OFF |
| 4 | ON | ON | ON |

TABLE 2

| SOL4 | Lock-up |
| --- | --- |
| ON | engage |
| OFF | release |

TABLE 3

| | | clutch 28 | clutch 27 | clutch 15 | clutch 54 | brake 36 | brake 30 | brake 56 | one-way clutch 37 | gear ratio |
| --- | --- | --- | --- | --- | --- | --- | --- | --- | --- | --- |
| | P | | | | o | | | | | |
| | R | | o | | o | o | | | | 2.181 |
| | N | | | | o | | | | | |
| D | first | o | | | o | | | | o | 2.458 |
| | second | o | | (o) | o | | o | | | 1.458 |
| | third | o | o | (o) | o | | | | | 1.000 |
| | OD | o | o | (o) | | | | o | | 0.685 |
| | 2 | o | | | o | | o | | | 1.458 |
| 1 | first | o | | | o | o | | | | 2.458 |
| | second | o | | | o | | o | | | 1.458 |

Electronic Control Circuit

Figures 1, 2:
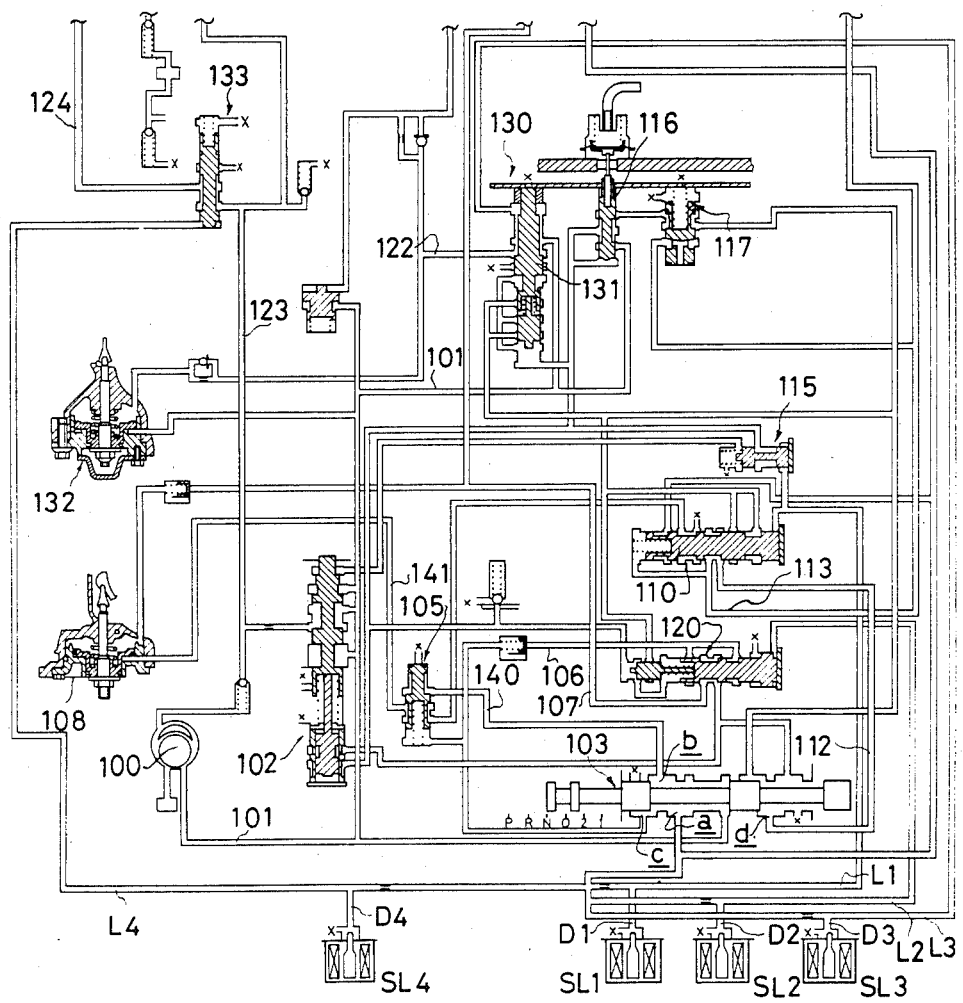
FIG. 2 is a diagram showing an electronic transmission control system for use with the transmission.
Figure 2:
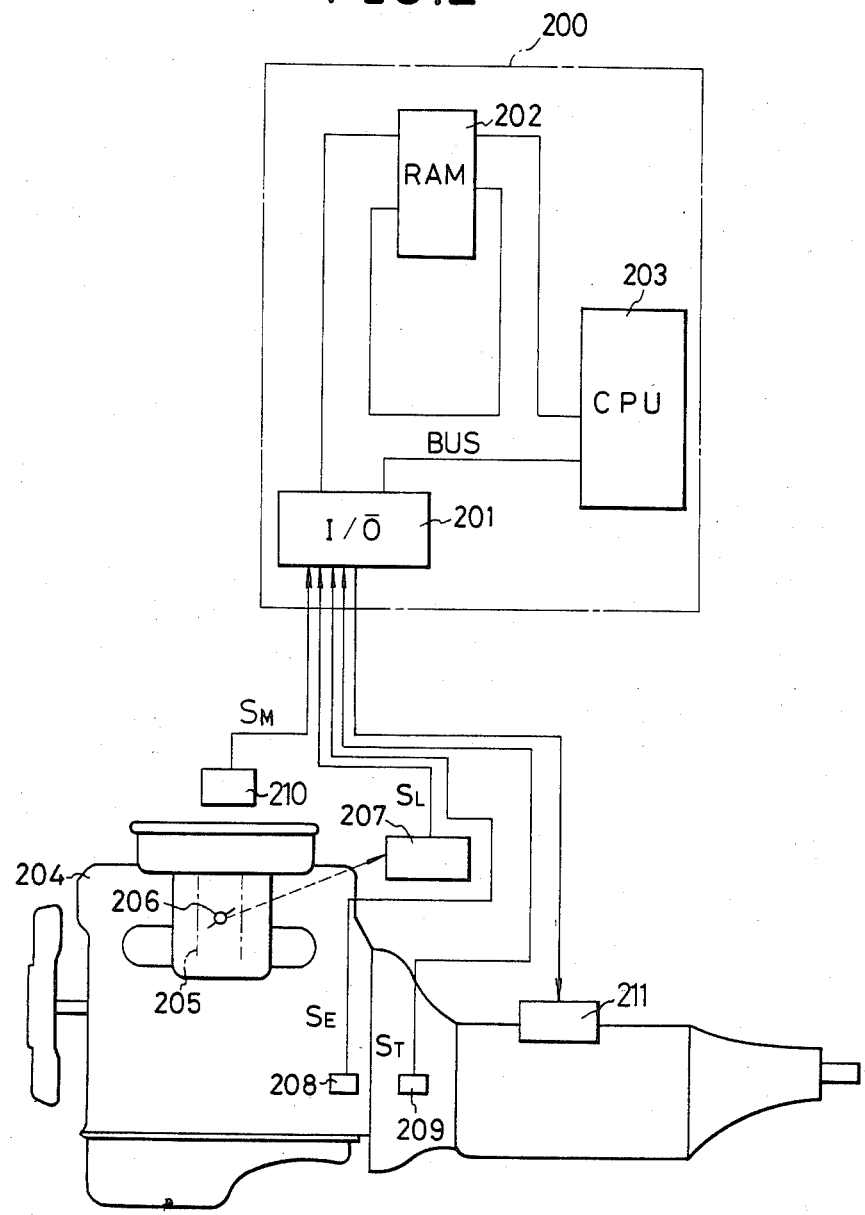

Referring to FIG. 2, there is shown an electronic control circuit 200 for controlling the above hydraulic control circuit. The electronic control circuit 200 can be constituted of a micro-computer which is provided with an input-output equipment (I/O) 201, a random access memory (RAM) 202 and a central processing unit (CPU) 203. For supplying signals to the I/O, there are provided an engine load sensor 207, an engine speed sensor 208, a torque converter turbine speed sensor 209 and a mode sensor 210. The engine load sensor 207 detects the load on an engine 204 in terms of the opening of an engine throttle valve 206 provided in the intake passage 205 of the engine 204 to produce an engine load signal SL. The engine speed sensor 208 senses the rotating speed of engine output shaft 1 or of any other shaft driven by the engine 204 to produce an engine speed signal SE. The turbine speed sensor 209 senses the rotating speed of the converter output shaft 14 to produce a turbine speed signal ST. The mode sensor 210 senses mode of operation of the vehicle, such as a power mode and an economy mode, to produce a mode signal SM. The operation mode may be selected as desired by an operator.

Figure 3:
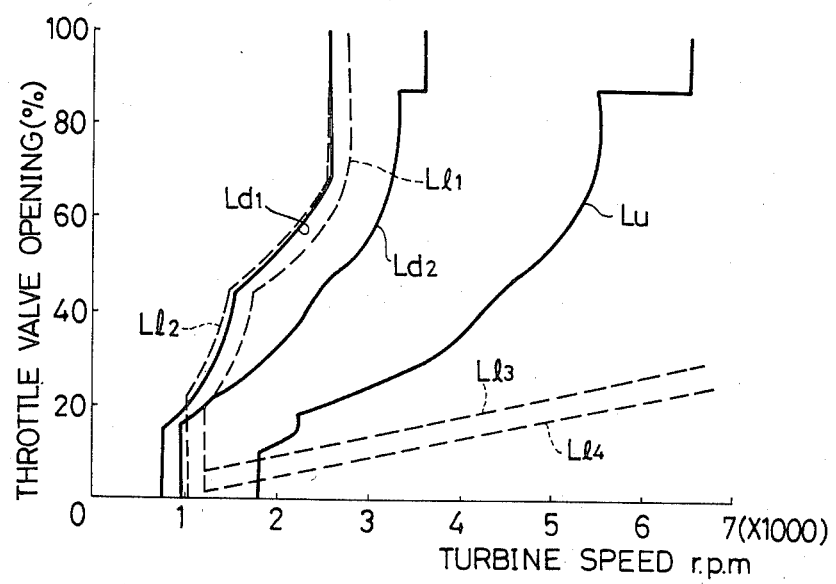
FIG. 3 shows a diagram of control maps in accordance with one embodiment of the present invention.

The I/O receives the engine load signal SL, the engine speed signal SE, the turbine speed signal ST and the mode signal SM, processes these signals, and applies them to the RAM 202. The RAM memorizes the signals SL, SE, ST and SM and applies these signals SL, SE, ST, SM and other data pre-stored in the RAM to the CPU in accordance with commands of the CPU. As examples of the prestored data there are a gear shift-up and shift-down maps and a lock-up control map as shown in FIG. 3. The map includes a gear shift-up control line Lu, gear shift-down control lines $Ld_1$, $Ld_2$ and torque converter lock-up control lines $Ll_1$, $Ll_2$, $Ll_3$ and $Ll_4$, which are drawn as functions of the engine throttle valve opening and the torque converter turbine speed. Among the lock-up control lines, the lines $Ll_3$ and $Ll_4$ are drawn along lines wherein the engine output torque is substantially zero. Lines $L1_3$ and $L1_4$ shown in FIG. 3 illustrate increasing turbine speed at the same time as increasing throttle valve opening. As another example of the pre-stored data, shift data lines may be provided as functions of the engine or turbine speed, the engine load and the operation mode of the vehicle.

In accordance with a certain program which can be adopted in the present invention, the CPU 203 reads one of the shift lines and the lock-up control map shown in FIG. 3 according to the engine load signal SL and the mode signal SM, and determines whether or not a shift operation shall be carried out on the basis of comparison of the engine or turbine speed signal SE or ST with the shift line concerned, and whether or not lock-up shall be effected on the basis of comparison of the engine or turbine speed signal SE or ST with the lock-up control map. The CPU 203 thus produces a shift signal and a lock-up signal and applies them to a group of solenoid valves 211 for operating the 1 - 2 shift valve 110, the 2 - 3 shift valve 120, the 3 - 4 shift valve 130 and the lock-up control valve 133. The group of solenoid valves 211 includes the solenoid valves SL1, SL2, SL3 and SL4 for the 1 - 2, 2 - 3 and 3 - 4 shift valves 110, 120 and 130 and the lock-up control valve 133.

General Operation

The gear shift and lock-up control by the aforementioned electronic control circuit 200 will now be described. Preferably, the control circuit 200 is a microprocessor which is programmed to carry out the operation in accordance with a flow chart, for example as shown in FIGS. 4, 5, 7 and 9.

Figure 4:
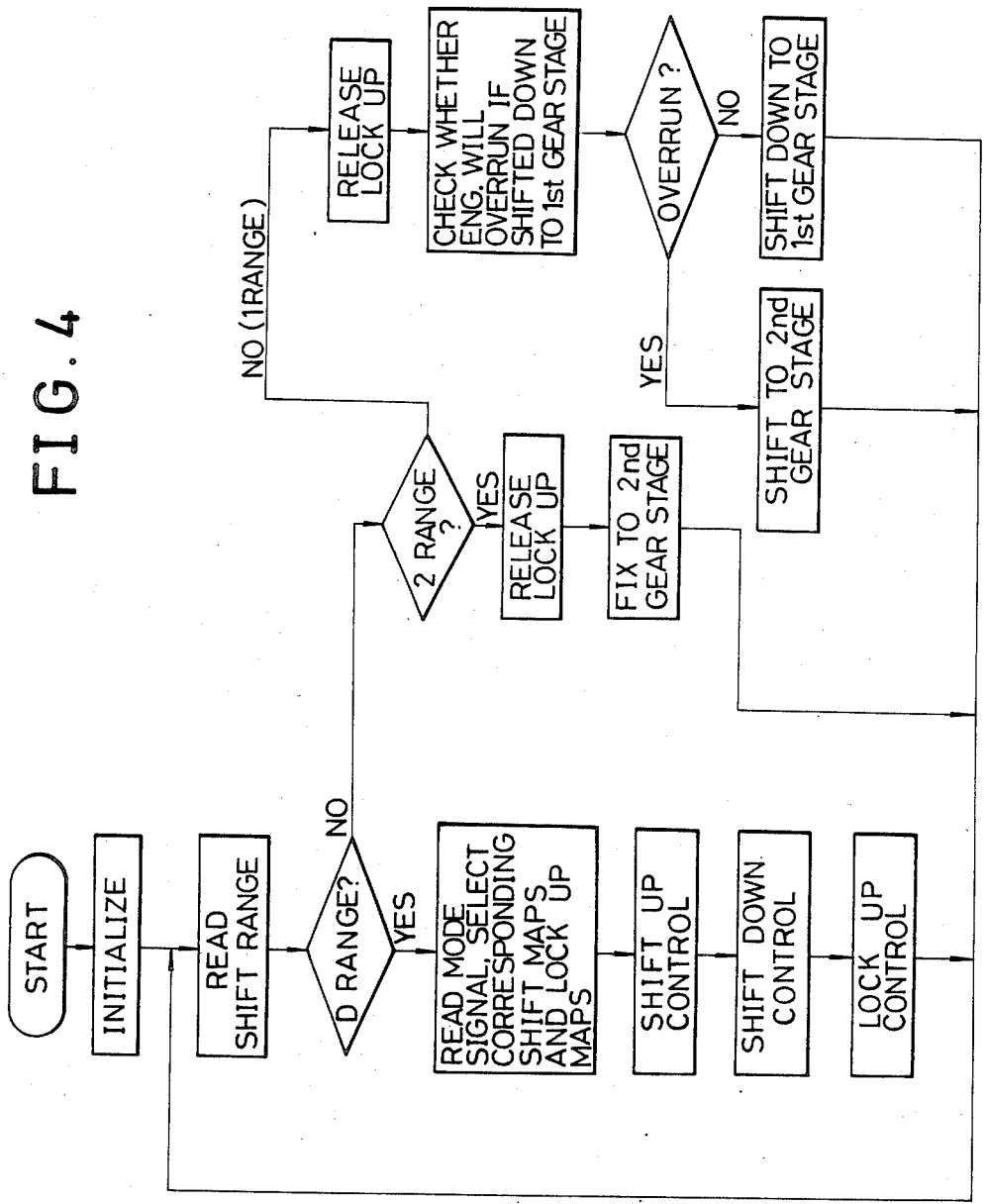
FIG. 4 is a flow chart showing the general control of the transmission.

FIG. 4 shows in general the operation of the control circuit. When the program is initiated, the ports in the respective hydraulic control valves and the counters in the circuit are brought into initial positions to thereby hold the gear mechanism at the first stage and release the torque converter lock-up clutch 15. Thereafter, the shift range or the position of the select valve 103 is read and a judgement is carried out as to whether the shift range is at the "D" range. If the judgement is NO, a further judgement is carried out as to whether the shift range is at the "2" range. If the judgement is YES, signals are applied to the shift valves to release the lock-up and to fix the gear mechanism 20 at the second stage. If the judgement is to indicate that the shift range is not at the "2" range, it is interpreted that the shift range is at the "1" range. In this range, the gear mechanism 20 can be either the first or the second stage. Then, a signal is produced to release the lock-up clutch and thereafter a judgement is made as to whether the engine will over-run if the gear mechanism is shifted down to the first stage. When the result of the judgement indicates that there will be no engine overrun, a signal is produced to hold the gear in the first stage. When it is judged that there will be an engine overrun, the gear mechanism is shifted to the second stage.

When the first-mentioned judgement indicates that the shift range is "D" range, the mode signal SM is read and appropriate control maps are selected in accordance with the mode signal. Thereafter, control of the gear shift-up, gear shift-down and lock-up is carried out in accordance with the selected maps.

Shift-up Control

Figures 5, 5A:
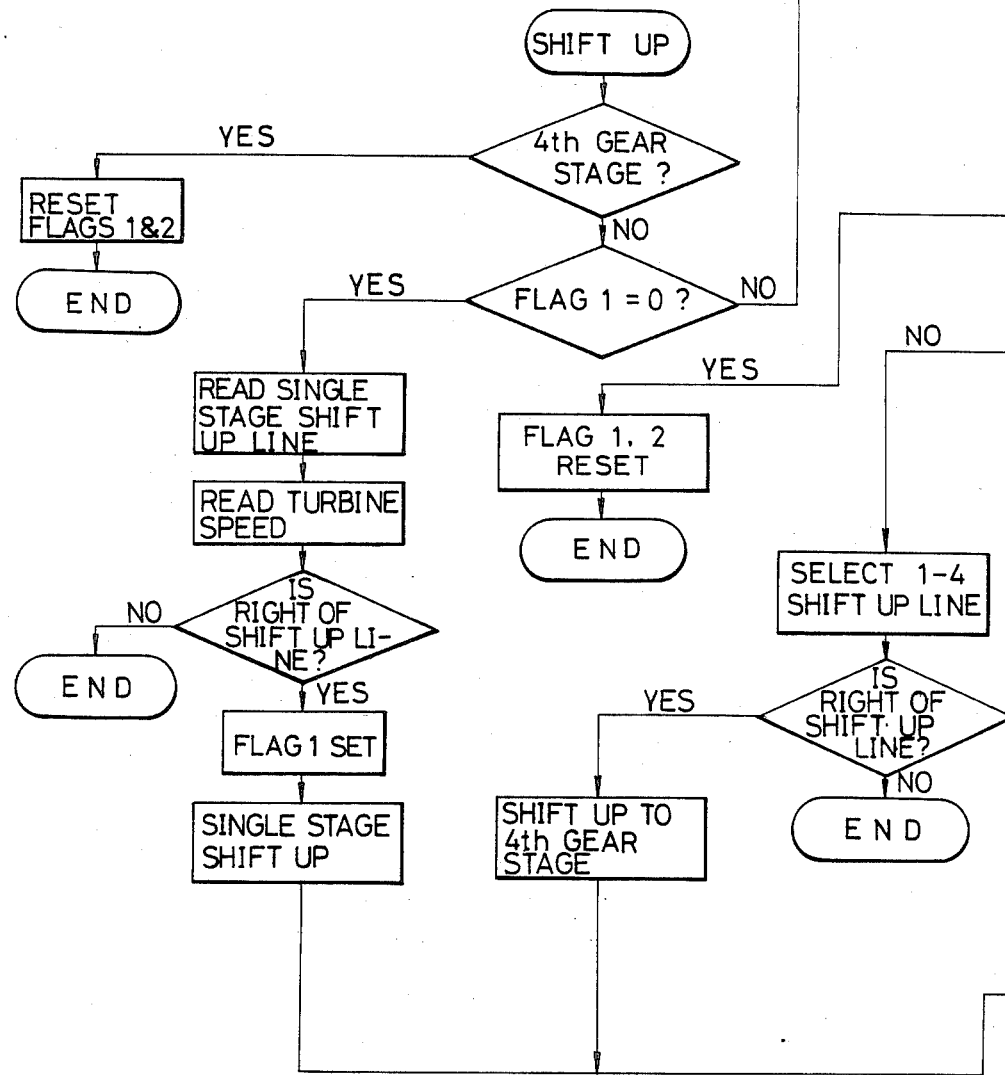
FIGS. 5, 5a and 5b are a flow chart showing the shift-up control.
Figure 5B:
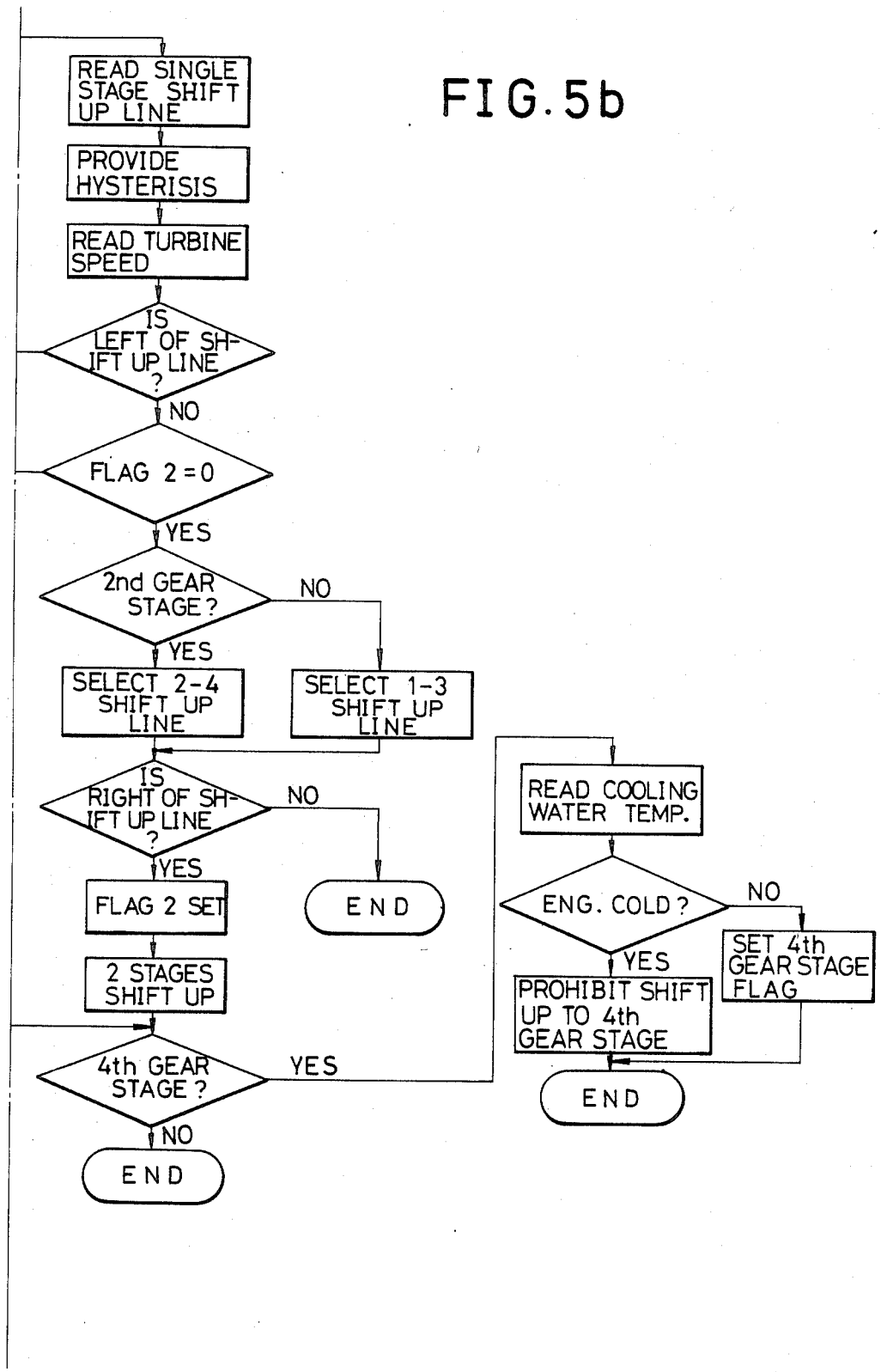

Referring to FIG. 5, the gear position of the transmission gear mechanism 20 is first read and a judgement is made as to whether the gear mechanism 20 is at the fourth stage. If the judgement is YES, flags 1 and 2 are reset and shift-up control is terminated because no further shift-up is possible. The flags 1 and 2 are provided for being set when a single stage shift-up and a skip shift-up are respectively carried out to memorize the shift-up.

Figure 6:
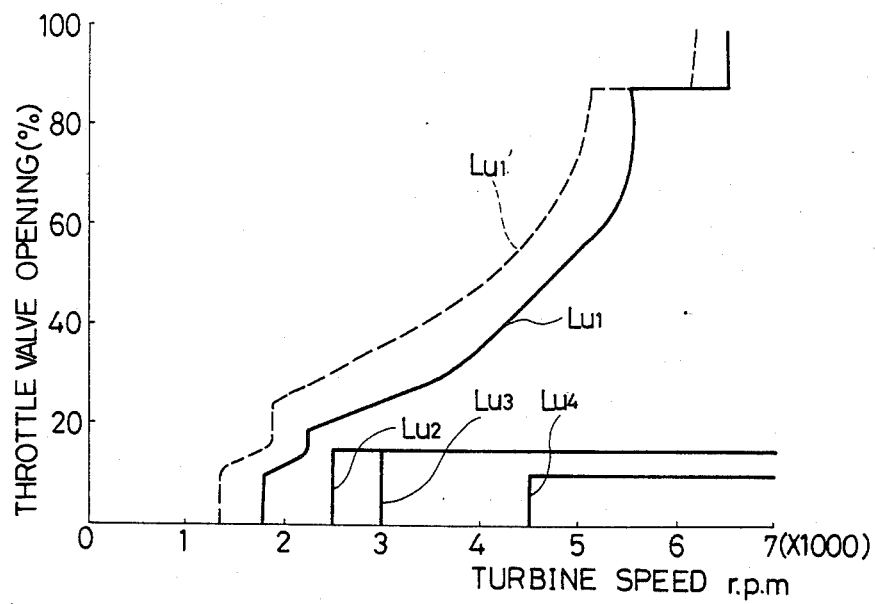
FIG. 6 is a diagram showing the shift-up control map shown in FIG. 3.

If the fourth gear stage judgement is NO, a judgement is made as to whether the flag 1 is reset to the "0" position. When the judgement is YES, the shift-up map as shown in FIG. 6 is read. Then, the torque converter turbine speed $T_{SP}$ is read and compared with the shift-up line $Lu_1$ in the single stage shift-up map to check whether the turbine speed is larger than the speed as determined by the shift-up line $Lu_1$. If the turbine speed is not larger than the speed as determined by the shift-up line $Lu_1$, the control is terminated, but if the former is larger than latter, the flag 1 is set and a command signal is produced to shift up the gear mechanism by one stage.

Where the flag 1 is not in the reset position, the single stage shift up line $Lu_1$ is read and multiplied by a figure between 0.8 and 0.95 to define a new shift-up line $Lu_1'$ having hysteresis with respect to the line $Lu_1$. Then, the actual turbine speed $T_{SP}$ is read and compared with the speed as determined by the line $Lu_1'$, to judge whether the speed $T_{SP}$ is smaller than the speed as determined by the line $Lu_1'$ under the given throttle valve opening. If the judgement is YES, the flags 1 and 2 are reset and the control is finished. If the judgement is NO, a further judgement is made as to whether the flag 2 is reset to "0". If the answer is YES, a judgement is further made as to whether the gear mechanism is at the second stage. If the judgement is YES, the 2 - 4 skip shift-up control line $Lu_2$ is selected for controlling the skip shift-up from the second gear stage to the fourth gear stage, but if the judgement is NO, the 1 - 3 skip shift up control line $Lu_3$ is selected for controlling the skip shift-up from the first gear stage to the third gear stage.

Thereafter, the turbine speed $T_{SP}$ is compared with the control line $Lu_2$ or $Lu_3$ to judge whether the speed $T_{SP}$ is larger than the speed as determined by the control line under the given throttle valve opening. The judgement NO makes the control end but the judgement YES causes the flag 2 to be set to thereby produce a command signal for carrying out the two-stage skip shift up.

If the judgement as to whether the flag 2 is reset to "0" is NO, the 1 - 4 skip shift-up control line $Lu_4$ is selected for a three-stage skip shift up from the first gear stage to the fourth gear stage. Then, the turbine speed $T_{SP}$ is compared with the speed as determined by the line $Lu_4$ under the given throttle valve opening and, if the former is not larger than the latter, the control is finished. If the former speed is larger than the latter speed, a command signal is produced to shift up the gear mechanism to the fourth gear stage.

Whenever the aforementioned command signals are produced, a judgement is made as to whether the signals contain a command for shifting up to the fourth stage and, if the judgement is NO, the control is finished. If the judgement is YES, a further judgement is made as to whether the engine operating condition is suitable for shifting up to the fourth gear stage. This judgement is carried out first by reading the engine cooling water temperature. If it is found that the engine cooling water temperature is lower than a predetermined value, a prohibition signal is produced to prohibit shifting up to the fourth gear stage. If it is judged that the engine is warmed up, the fourth gear stage flag is set to show that the gear mechanism is being shifted up to the fourth stage and finish the control.

Shift Down Control

Figure 7:
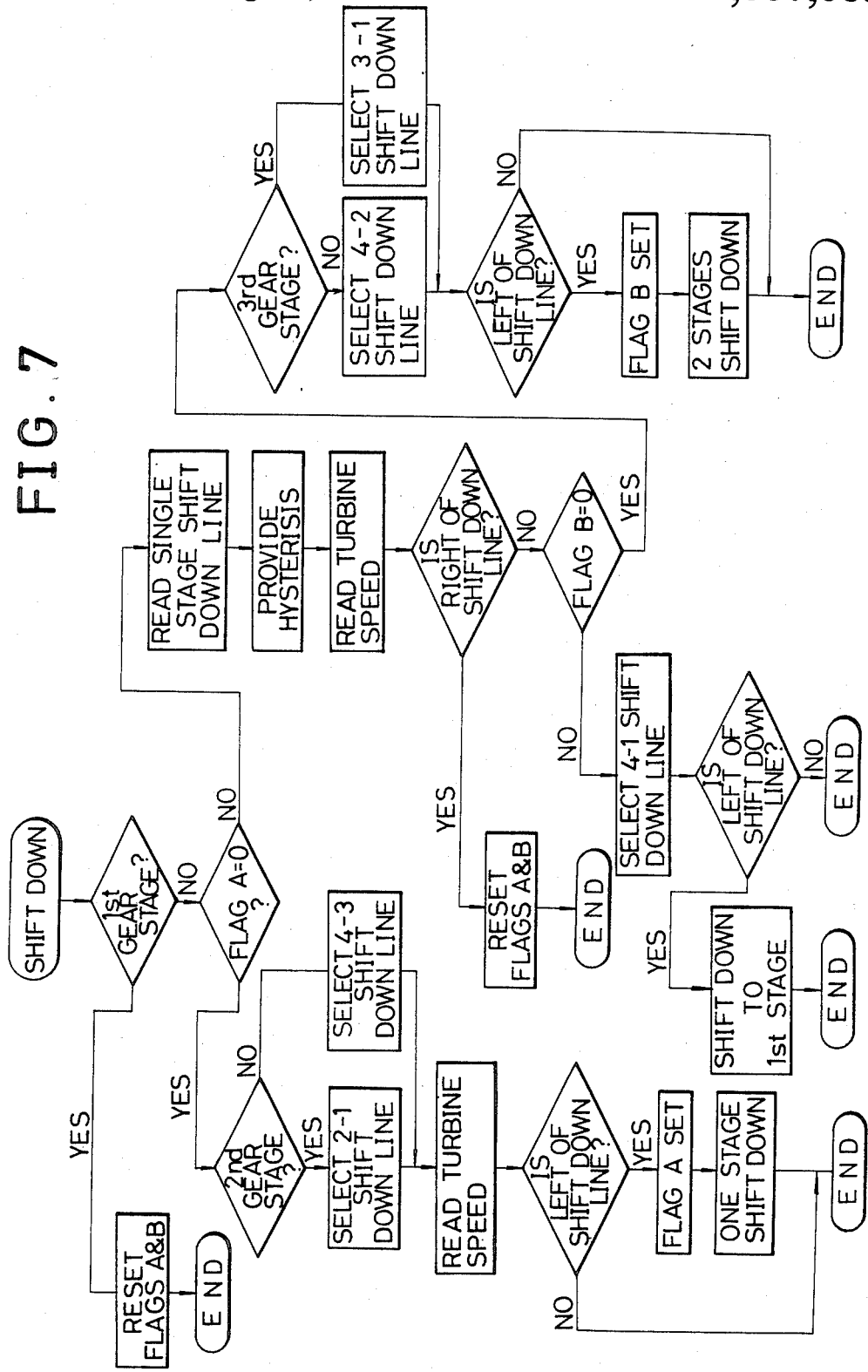
FIG. 7 is a flow chart showing the shift-down control.

As shown in FIG. 7, in the gear shift down control, the gear position of the transmission gear mechanism 20 is first read and it is judged whether the gear mechanism is at the first stage. If the judgement is YES, no further control can be carried out so that the flags A and B are reset to "0" and finish the control. The flags A and B are provided for being set to "1" when the single stage shift down and the skip shift down are respectively carried out.

Figure 8:
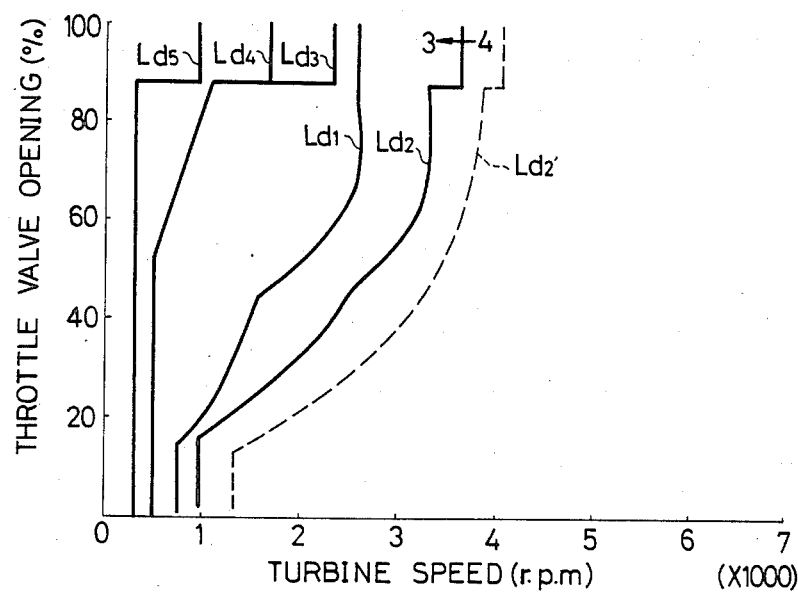
FIG. 8 is a diagram showing the shift-down control map shown in FIG. 3.

If the aforementioned judgement is NO, a further judgement is made as to whether the flag A is reset to "0", and if the judgement is YES, a still further judgement is made as to whether the gear mechanism is at the second stage. When the result of this judgement is YES, the 2 - 1 shift down control line $Ld_1$ is selected as shown in FIG. 8 for controlling the shift down from the second to first stage of the gear mechanism, but when the judgement is NO, the 4 - 3 and 3 - 2 shift down control lines $Ld_2$ are selected. Since the relationship between the gear ratios in the fourth and third gear stages is substantially the same as that in the third and second gear stages, and the shift down control is made based on the torque converter turbine speed, the same shift down control line $Ld_2$ can be used for the shift down control from the fourth gear stage to the third gear stage and that from the third stage to the second gear stage. Then the turbine speed $T_{SP}$ is compared with the speed as determined by either of the lines $Ld_1$ and $Ld_2$ to judge whether the actual turbine speed is smaller than the speed as determined by the control line under the given throttle valve opening. When the former is not smaller than the latter, the control is finished but, if the former is smaller than the latter, the flag A is set and a command signal is produced for a single stage shift down.

If the flag A is not reset to "0", the 4 - 3 and 3 - 2 shift lines $Lu_2$ are multipled by a figure between 1.05 and 1.2 to define a new control line $Ld_2'$, which has hysteresis with respect to the control line $Ld_2$ as shown by dotted lines in FIG. 8. Then, the turbine speed $T_{SP}$ is compared with the speed as determined by the control line $Lu_2'$, under the given throttle valve opening. If the former speed is larger than the latter, the flags A and B are reset to "0" and finish the control. If the former is not larger than the latter, a further judgement is made as to whether the flag B is reset to "0". If this judgement is YES, a still further judgement is made as to whether the gear mechanism is at the third stage. If it is not at the third gear stage, the 4 - 2 skip shift down control line $Ld_3$ is selected but, if the gear mechanism is at the third gear stage, the 3 - 1 skip shift down control line $Ld_4$ is selected.

Then, the turbine speed $T_{SP}$ is compared with the speed as determined by either of the lines $Ld_3$ and $Ld_4$ under the given throttle valve opening to check whether the former is smaller than the latter. If the former is not smaller than the latter, the control is finished but, if the former is smaller than the latter, the flag B is set and a two stage shift down signal is produced.

When the flag B is not reset to "0", the 4 - 1, skip shift down control line $Ld_5$ is selected for carrying out the three stage skip shift down from the fourth gear stage to the first gear stage. Then, the turbine speed $T_{SP}$ is compared with the speed as determined by the line $Ld_5$ under at the given throttle valve opening to check whether the former is smaller than the latter. If the former is not smaller than the latter, the control is finished but, if the former is smaller than the latter, a skip shift down signal is produced for shifting down from the fourth gear to the first gear stage.

Lock-up Control

Figures 9, 9A:
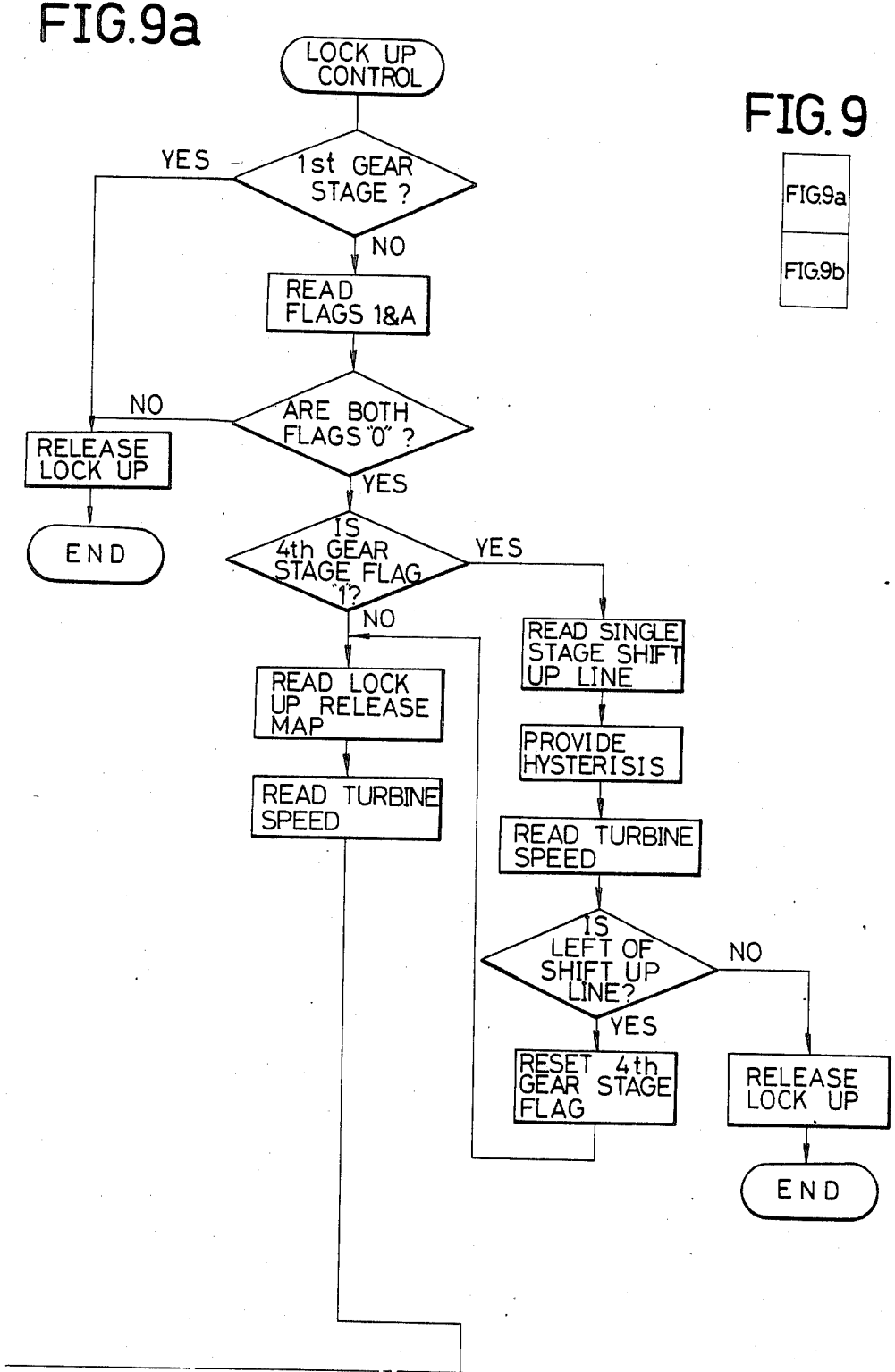
FIGS. 9, 9a and 9b are a flow chart showing the lock-up control.
Figure 9B:
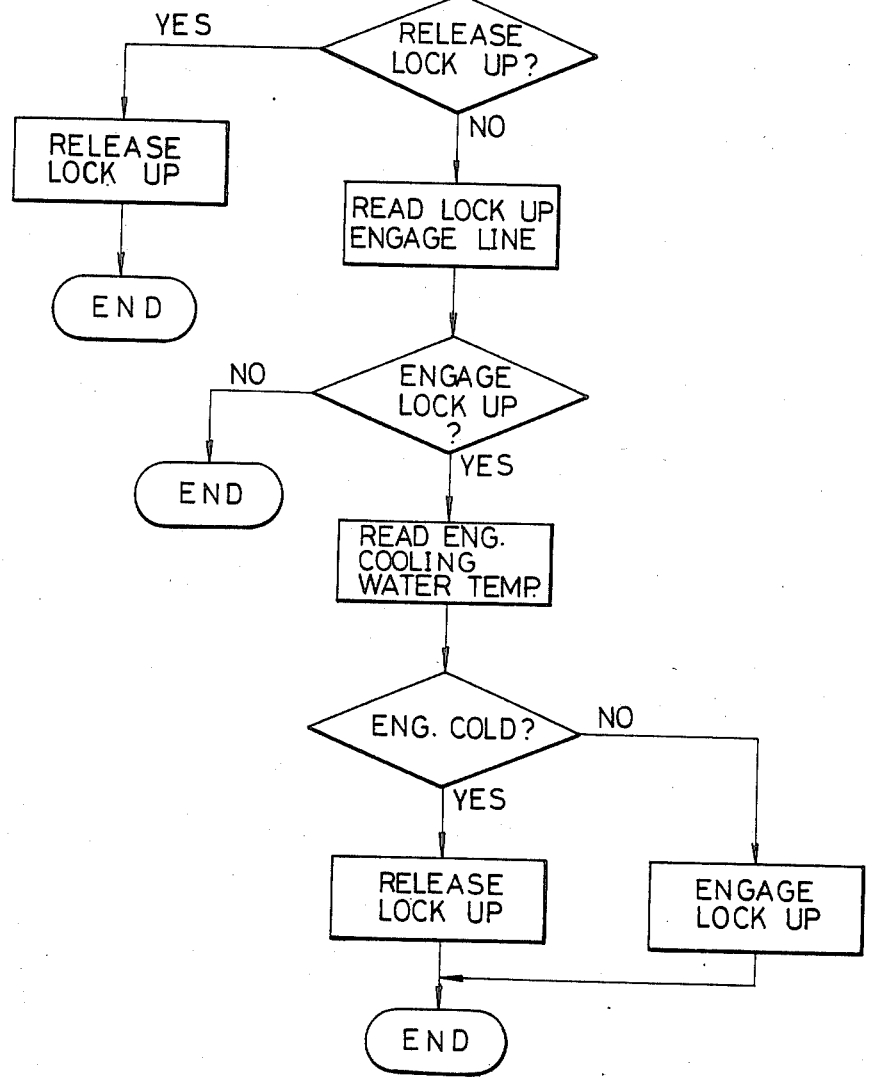

As shown in FIG. 9, in the lock-up control, the gear position of the transmission gear mechanism 20 is first read and a judgement is made as to whether the gear mechanism is at the first stage. If the judgement is YES, the lock-up release signal is produced since lock-up is not made at the first gear stage. If the judgement is NO, however, the flags 1 and A are read and a judgement is made as to whether the both flags 1 and A are reset to "0". When this judgement is NO, lock-up is released and the control is finished. If this judgement is YES, however, the fourth gear stage flag is read to check whether it is set to "1".

If the fourth gear stage flag is set to "1", the single stage shift up control line $Lu_1$ as shown in FIG. 6 is read and multiplied by a figure between 0.8 and 0.95 to define the aforementioned new control line $Lu_1'$. Then, the actual turbine speed $T_{SP}$ is compared with the speed as determined by the line $Lu_1'$ to check whether the former speed is smaller than the latter speed. If the former speed is not smaller than the latter speed, lock up is released and the control is finished. If the former speed is smaller than the latter speed, the fourth stage flag is reset.

When the fourth gear stage flag is not set to "1" or is reset to "0" through the procedure described above, the lock-up release control line LIF is read in the lock up control map. The lock up release control line LIF comprises a first lock up release line LIF1, which is similar to the lock up release line in a conventional control system, and a second lock up release control line LIF2, which is determined along the line in which the engine output torque is substantially zero. Thereafter, the turbine speed $T_{SP}$ is compared with the lock up control line LIF at the given throttle valve opening to determine whether the lock up shall be released. For that purpose, the turbine speed $T_{SP}$ is at first compared with the speed as determined by the first control line LIF1 under the given throttle valve opening to check whether the former is smaller than the latter and then with the speed as determined by the second control line LIF2 under the given throttle valve opening to check whether the former is larger than the latter.

Figure 10:
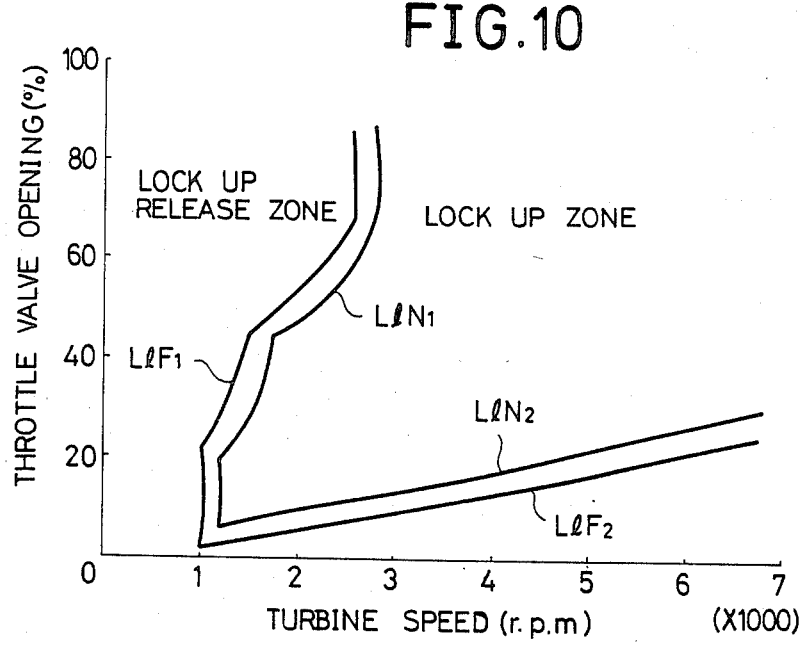
FIG. 10 is a diagram showing the lock-up control map shown in FIG. 3.

If either of these conditions is met, it is judged that lock up shall be released and a lock up release signal is produced. If neither of the aforementioned conditions is met, the lock up engage control line LIN is read as shown in FIG. 10. The lock up engage control line LIN comprises a first lock up engage line LIN1 which is similar to the lock up engage control line in a conventional system, and a second lock up engage line LIN2 which is drawn along a line in which the engine output torque is substantially zero. As noted in FIG. 10, the lock up engage control line LIN is offset from the release line LIF in order to avoid hunting of the control.

The turbine speed $T_{SP}$ is then compared with the lock up engage control line LIN to determine whether lock up shall be engaged at the given throttle valve opening. The judgement is made by first comparing the turbine speed $T_{SP}$ with the speed as determined by the first lock up engage line LIN1 at the given throttle valve opening to check whether the former speed is larger than the latter speed, and then comparing with the speed as determined by the second control line LIN2 at the given throttle valve opening to check whether the turbine speed $T_{SP}$ is smaller than the speed as determined by the LIN2.

If either of the above conditions is met, the engine cooling water temperature is read. When it is judged that the engine is sufficiently warmed up, a lock up engage signal is produced. If the engine temperature is found to be low, a lock up release signal is produced.

The invention has thus been shown and described with reference to a specific embodiment; however, it should be noted that the invention is in no way limited to the details of the illustrated arrangements, but changes and modifications may be made without departing from the scope of the appended claims.

We claim:

1. A motor vehicle including
    an engine having an engine output shaft,
    a torque converter having an input member and an output member, the input member of the torque converter being connected with the engine output member to be driven thereby,
    lock-up means adapted for connecting said input and output members of said torque converter, said lock-up means having means for actuating said lock-up means into and out of engagement,
    speed detecting means for detecting rotating speed related to rotating speed of one of said input and output members of the torque converter and producing a speed signal,
    engine load detecting means for detecting engine load and producing a load signal,
    lock-up control means including means for defining first lock-up control lines as a function of the engine load and said rotating speed to define a lock-up zone as an area where the rotating speed is higher than a rotating speed value determined by the first lock-up control lines at a given engine load, and second lock-up control lines defined as a function of the engine load and said rotating speed and which increase as a function of increasing engine load and increasing rotating speed and which are each determined substantially along a zero engine output torque line where there is substantially no torque transfer between said engine output shaft and said output member of the torque converter, said lock-up zone defining an area where the engine load is greater than zero,
    means for comparing an engine operating condition as obtained by said speed signal and said load signal with said first and second lock-up control lines, and
    means for producing a lock-up release signal which is applied to said lock-up means to disengage said lock-up means when the engine operating condition is out of the lock-up zone.

2. A motor vehicle in accordance with claim 1 in which said torque converter is of a hydrodynamic type wherein hydraulic fluid is circulated during operation, said lock-up means including a lock-up clutch which is adapted to be forced into engagement under pressure of the hydraulic fluid circulating in said torque converter, and lock-up release means for applying lock-up releasing hydraulic pressure to said lock-up clutch.

3. A motor vehicle in accordance with claim 2 in which said lock up release means includes solenoid valve means for controlling the hydraulic pressure applied to the lock up clutch, said lock-up control means being connected to said solenid valve means to apply the lock up release signal to said solenid valve means.

4. A motor vehicle in accordance with claim 1 in which said speed detecting means is a speed detector for detecting the speed of said output member of the torque converter.

5. A motor vehicle in accordance with claim 1 in which said first lock-up control lines are determined in accordance with said rotating speed and said engine load where the rotating speed of said output member of the torque converter is close to the rotating speed of the input member.

6. A motor vehicle in accordance with claim 5 in which said lock up control means includes processing means having memory means containing said first and second lock-up control lines.

7. A motor vehicle including
    an engine having an engine output shaft,
    a torque converter having an input member and an output member, the input member of the torque converter being connected with the engine output member to be driven thereby,
    a transmission gear mechanism connected with the output member of the torque converter,
    lock-up means adapted for connecting said input and output members,
    electromagnetic means for controlling a supply of hydraulic pressure to said lock-up means to thereby govern engagement and release of said lock-up means,
    torque converter output speed detecting means for detecting a rotating speed of said output member of said torque converter and producing a speed signal,
    engine load detecting means for detecting a load on said engine and producing a load signal, and lock-up control means including memory means having first lock-up control lines for determining engagement and release of said lock-up means when the rotating speed of the output member of the torque converter is close to that of the input member and second lock-up control lines defined as a function of said rotating speed and which increase as a function of increasing engine load and increasing rotating speed, each of said second lock-up control lines being drawn as a function of said rotating speed of said output member of the torque converter and said engine load along a line wherein engine output torque is substantially zero, said lock-up control means being connected with said speed and engine load detecting means to receive said signals therefrom, said lock-up control means including means for comparing said signals with said first and second lock-up control lines and producing a lock-up control signal for controlling said lock-up means.

8. A motor vehicle in accordance with claim 7 in which each of said first and second lock-up control lines comprises a lock-up engage line and a lock-up release line which are spaced apart to provide hysteresis.

* * * * *